United States Patent
Henkel et al.

(10) Patent No.: US 10,894,698 B2
(45) Date of Patent: Jan. 19, 2021

(54) CABIN LIFTER FOR A MATERIAL TRANSFER UNIT

(71) Applicant: Liebherr-Hydraulikbagger GmbH, Kirchdorf/Iller (DE)

(72) Inventors: Stephan Henkel, Memmingen (DE); Phillip Altvater, Oberopfingen (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 195 days.

(21) Appl. No.: 15/840,713

(22) Filed: Dec. 13, 2017

(65) Prior Publication Data
US 2018/0179028 A1      Jun. 28, 2018

(30) Foreign Application Priority Data

Dec. 22, 2016   (DE) .......................... 10 2016 015 384

(51) Int. Cl.
| | |
|---|---|
| *B66C 13/54* | (2006.01) |
| *F16F 1/38* | (2006.01) |
| *E02F 9/16* | (2006.01) |
| *B66C 23/00* | (2006.01) |
| *E02F 9/22* | (2006.01) |
| *B66F 3/25* | (2006.01) |
| *B62D 33/063* | (2006.01) |
| *F16F 9/54* | (2006.01) |

(52) U.S. Cl.
CPC ............ *B66C 13/54* (2013.01); *B62D 33/063* (2013.01); *B66C 23/54* (2013.01); *B66F 3/25* (2013.01); *E02F 9/166* (2013.01); *E02F 9/22* (2013.01); *F16F 1/38* (2013.01); *F16F 1/3835* (2013.01); *F16F 9/54* (2013.01); *B66F 2700/052* (2013.01)

(58) Field of Classification Search
CPC .. B66F 3/24; B66F 3/245; B66F 3/247; B66F 3/25; B66F 3/30; B66F 3/32; B66F 9/04; B66F 9/06; B66F 11/04; B66F 11/042; B66F 2700/05; B66F 2700/052; B66F 2700/055; B66F 2700/057; F16F 1/38; F16F 1/3835; F16F 9/54; F16F 13/14; F16F 13/16; B66C 13/54; B66C 23/54; B62D 33/063; E02F 9/166; E02F 9/22
USPC ..... 254/93 VA, 93 R, 93 L, 2 C, 10 R, 10 C, 254/89 R, 124
See application file for complete search history.

(56) References Cited

U.S. PATENT DOCUMENTS

| | | | |
|---|---|---|---|
| 5,730,262 A * | 3/1998 | Rucks ..................... | F16F 1/371 188/321.11 |
| 6,517,062 B2 * | 2/2003 | Kuwayama ............. | F16F 1/387 267/140.12 |

(Continued)

FOREIGN PATENT DOCUMENTS

| | | | |
|---|---|---|---|
| CN | 103423351 A | 12/2013 | |
| DE | 202004011990 U1 | 1/2006 | |
| DE | 102005026084 A1 * | 12/2006 | ........... B62D 33/067 |

(Continued)

*Primary Examiner* — Lee D Wilson
*Assistant Examiner* — Robert F Neibaur
(74) *Attorney, Agent, or Firm* — McCoy Russell LLP

(57) ABSTRACT

The present disclosure relates to a cabin lifter for a material transfer unit comprising at least one hydraulic cylinder supported in a damped manner. The present disclosure is further directed to a corresponding damping bush for damping the hydraulic cylinder and to a material transfer unit comprising a corresponding cabin lifter.

13 Claims, 3 Drawing Sheets

(56) References Cited

U.S. PATENT DOCUMENTS 7,419,023 B2     9/2008    Mieger
8,813,600 B2 *   8/2014    Breu .................... B62D 33/063
                                                                     296/190.05

FOREIGN PATENT DOCUMENTS

DE       102005026084 A1    12/2006
EP             0081707 A1 *   6/1983            F15B 15/226
JP           2008248898 A  *   10/2008            F15B 15/226

* cited by examiner

US 10,894,698 B2

CABIN LIFTER FOR A MATERIAL TRANSFER UNIT

CROSS REFERENCE TO RELATED APPLICATION

This application claims priority to German Patent Application No. 10 2016 015 384.9, entitled "Cabin Lifter For a Material Transfer Unit," filed Dec. 22, 2016, the entire contents of which is hereby incorporated by reference in its entirety for all purposes.

TECHNICAL FIELD

The present disclosure relates to a cabin lifter for a material transfer unit comprising at least one hydraulic cylinder supported in a damped manner. The present disclosure is further directed to a damping bush for damping the hydraulic cylinder and to a material transfer unit comprising a corresponding cabin lifter.

BACKGROUND

In known material transfer units comprising a cabin lifter, acceleration, in particular vertical acceleration, is transmitted onto the cabin provided at the cabin lifter and thus onto the operator therein operating the machine via the equipment or via a superstructure of the material transfer unit and via the cabin lifter itself. It is known in accordance with the prior art to provide a hydraulic damping of a corresponding hydraulic cylinder with, for example, a burst pipe protection, a membrane store and/or with various check valves to reduce these accelerations that are negative for the machine and for the operator.

It is disadvantageous in the solutions known from the prior art that the known hydraulic damping processes can only ensure a limited damping with a correspondingly limited comfort. At the same time, the known apparatus comprise a comparatively large number of complex components, of which some are also expensive, which makes the known apparatus correspondingly expensive and prone to defects as well as not particularly easy to assemble and/or manufacture.

SUMMARY

It is the object of the present disclosure to provide an improved and less expensive solution for the damping of the cabin lifter of a corresponding material transfer unit. The cabin lifter in accordance with the present disclosure can minimize the vertical accelerations, and optionally further accelerations, with working clearances or on the carrying out of work, in particular in a raised state or in a state with a raised hydraulic operator's cabin elevation.

A cabin lifter is accordingly provided whose hydraulic cylinder for adjusting the cabin lifter is supported via at least one damping bush at the cabin lifter and/or at another section of the material transfer unit. The hydraulic cylinder can be configured as part of the cabin lifter that is coupled via said damping bush to further parts of the cabin lifter and/or to other sections of the material transfer unit. The hydraulic cylinder may be a cylinder/piston apparatus configured for a hydraulic movement of the cabin lifter. The other section of the material transfer unit can be any section(s) of the material transfer unit that are not part of the cabin lifter.

The cabin lifter in accordance with the present disclosure is the mechanically damped support of the hydraulic cylinder for the movement of the cabin lifter relative to the material transfer unit in a damping element, in particular in a damping bush or by means of a corresponding element. The damping bush can be arranged at the ground side and, alternatively or additionally, at the bar side at the hydraulic cylinder. Due to the sole use of a corresponding mechanical damping bush, the necessity for complex hydraulic damping systems is dispensed with, whereby savings can be made in the manufacture of the apparatus and further ones of the above-named problems that can occur with cabin lifters in accordance with the prior art can be avoided.

It is conceivable in an embodiment that the damping bush is a rubber-metal bush. It can thus comprise at least one rubber section and at least one metal section that can be in direct contact with one another. It is conceivable that the two said lower sections of the rubber-metal bush are each produced in one piece. The damping bush thus represents a purely mechanical damping apparatus for the hydraulic cylinder and thus differs from the known hydraulic damping apparatus of the prior art.

It is conceivable in a further embodiment that the damping bush is coupled to the cabin lifter and/or to another section of the material transfer unit by means of at least one bearing shell. The bearing shell can be produced from two similar or identical halves that are configured to receive the damping bush within a recess provided at the bearing shell. The bearing shell can, for example, be screwed to adjacent structures such as the cabin lifter, to couple the damping bush.

It is conceivable in a further embodiment that the damping bush comprises at least one first leadthrough that is arranged radially centrally and one further leadthrough that may be at least partly cylindrical. A coupling element for coupling the damping bush to the hydraulic cylinder can be provided within the leadthrough. The coupling element can in turn be fixed within the leadthrough in a force-transmitting or shape-matched manner by means of securing means, Provision can be made in an embodiment that the damping bush comprises at least one second leadthrough at the damping bush that is disposed radially further outwardly than the first leadthrough. The at least one second leadthrough can influence the elasticity of the damping bush by its design and may be provided within the rubber section of the damping bush. It is possible by means of the second leadthrough to influence the elasticity of the damping bush and thus to influence the damping behavior of the damping bush and to define a desired damping behavior, for example by the size and/or position of the second leadthrough.

It is conceivable in a further embodiment that the damping bush comprises at least one recess extending in the peripheral direction of the damping bush. The recess can in this respect, for example, be provided within the rubber section of the damping bush and can be designed as deeper, wider, or modified in another manner as desired, to define an elastic behavior of the damping bush.

It is conceivable in a further embodiment that the at least one second leadthrough is oriented in the direction of the hydraulic cylinder. An orientation of the second leadthrough differing therefrom is also conceivable in which said second leadthrough is, for example, oriented permanently vertically with respect to the horizontal and is not formed in dependence on the variable orientation of the hydraulic cylinder.

The present disclosure is further directed to a damping bush for a hydraulic cylinder of a cabin lifter, wherein the damping bush is a rubber-metal bush. The damping bush can further comprise all or some of the features that are named in the description with respect to the damping bush of the cabin frame. An explicit repetition of the features is therefore dispensed with.

The present disclosure is further directed to a material transfer unit comprising a cabin lifter in which the frame is in this respect at least partly connected to the remaining structure of the material transfer unit via a damping bush.

Further details and advantages of the present disclosure are explained with reference to the embodiment shown by way of example in the Figures.

DETAILED DESCRIPTION

Figure 1:
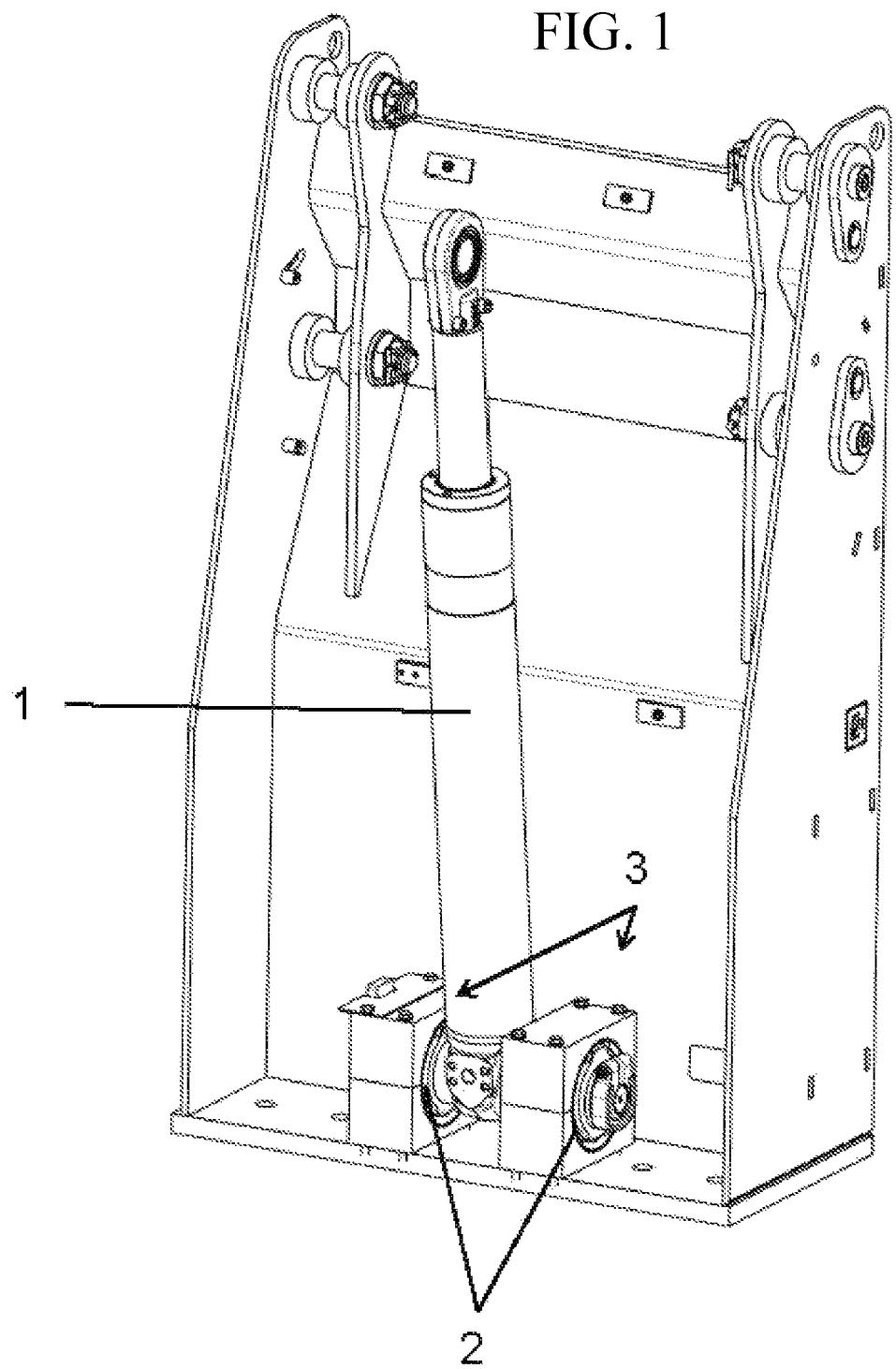
FIG. 1 shows a part of a cabin lifter in accordance with the present disclosure with a hydraulic cylinder.

FIG. 1 shows a cabin lifter in accordance with the present disclosure for a material transfer unit comprising a hydraulic cylinder 1 that is coupled to a lower section of the cabin lifter via two damping bushes 2 in the embodiment of FIG. 1. Said lower section of the cabin lifter can be a connector or a connector section that is configured for coupling the cabin lifter to the remaining structure of a material transfer unit, not shown in more detail, and may comprise leadthroughs for said coupling.

The damping bush 2 or the damping bushes 2 are provided at the ground side at the hydraulic cylinder 1 in the embodiment of the Figure.

Provision can alternatively or additionally be made that one or more damping bushes 2 are provided at a bar-side coupling side of the hydraulic cylinder 1. This bar-side coupling point can, for example, be coupled to the sections of the cabin lifter shown in FIGS. 2 and 3.

An embodiment of the cabin lifter is thus also conceivable in which, for example, four damping bushes 2 are provided for coupling the hydraulic cylinder 1 to the cabin lifter and/or to other structures of the material transfer unit. The damping bush 2 can accordingly be provided at the ground side and/or at the bar side at the hydraulic cylinder 1.

As can be seen from FIG. 1, a bearing shell 3 or a plurality of bearing shells 3 can be provided for coupling the damping bush 2 or the damping bushes 2 to structures of the cabin lifter or to other sections of the material transfer unit.

The bearing shells 3 can here have a depth that is no larger than the depth of the connector section at which the bearing shells 3 are provided.

The bearing shell 3 or the bearing shells 3 may comprise cylindrical recesses or at least partly cylindrical recesses for receiving the damping bush 2. It is possible by means of the bearing shell 3, for example, to screw a damping bush 2 to the further structure of the cabin lifter and/or to the material transfer unit.

As can further be seen from FIG. 1, the bearing shell 3 can, for example, comprise leadthroughs for fixing means such as screws. In the embodiment of FIG. 1, each bearing shell 3 or each component of the bearing shells 3 comprises exactly four leadthroughs for corresponding fixing means. Embodiments of the bearing shell 3 having a number of leadthroughs differing therefor are, however, also conceivable.

The bearing shell 3 or the bearing shells 3 can be provided at the hydraulic cylinder 1 at both sides and may be arranged symmetrically to one another. The bearing shells 3 can furthermore be retrofitted to existing material transfer units and cabin lifters in accordance with the present disclosure can thus be simply retrofitted as required.

It is also conceivable that the bearing shells 3 or parts of the bearing shells 3 are formed in one piece with components of the cabin lifter. At least a lower part of a bearing shell 3 may be produced in one piece with a lower section of the cabin lifter or can be welded to a lower section of the cabin lifter.

Figure 2:
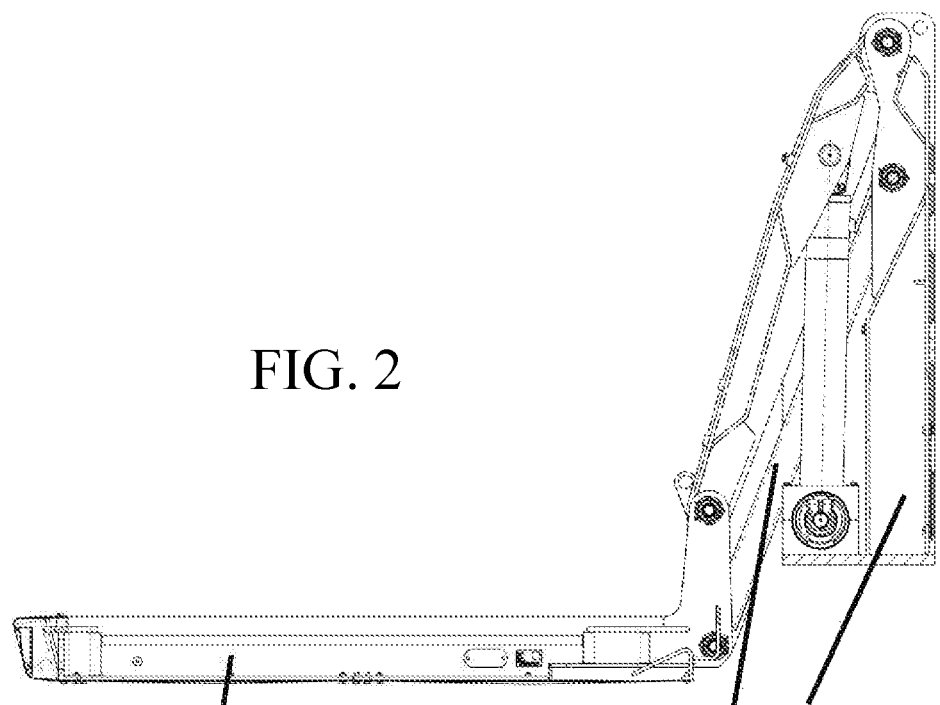
FIGS. 2 and 3 show a cabin lifter in accordance with the present disclosure in a side view and in different pivot states.
Figure 3:
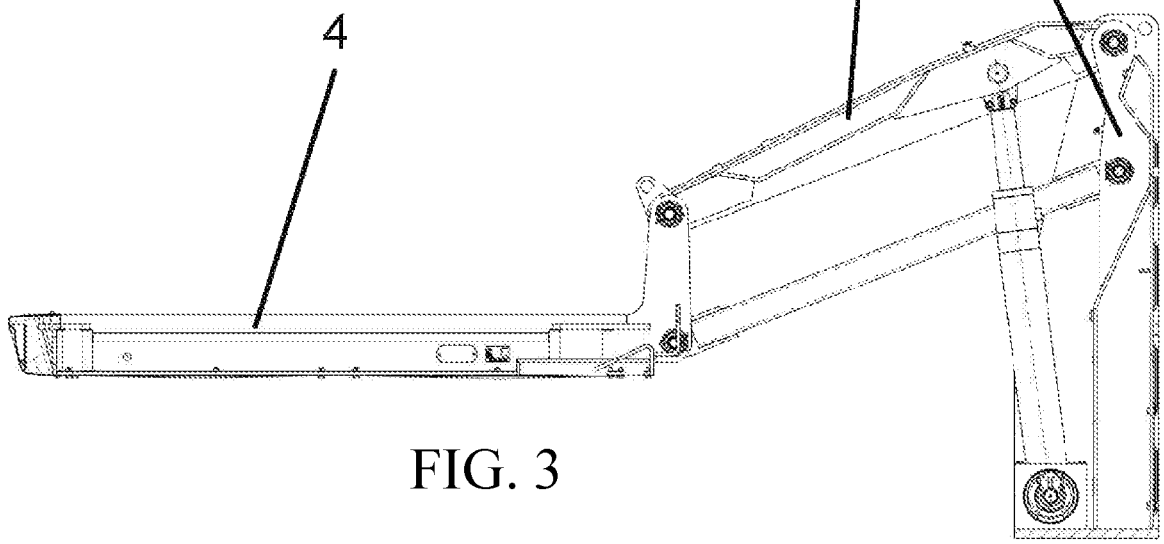

FIGS. 2 and 3 show the cabin lifter in a position pivoted to the bottom (FIG. 2) and in a position pivoted substantially horizontally (FIG. 3). The cabin lifter can comprise a pedestal section 4 that is connected to a unit section 5 via, for example, a four-bar linkage 6 such that the pedestal section 4 is aligned horizontally in all pivot positions.

Figure 4:
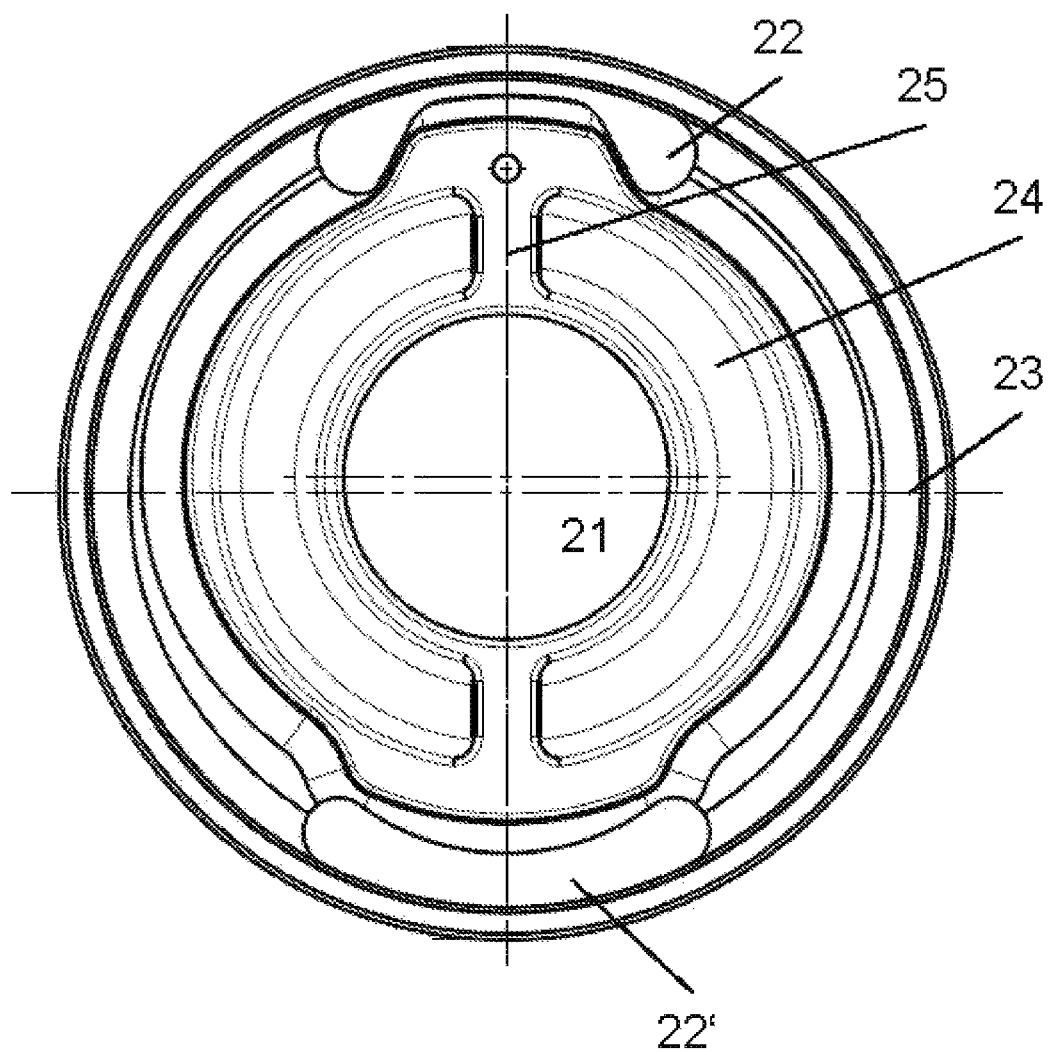
FIG. 4 shows a damping bush in accordance with the present disclosure.

FIG. 4 shows an enlarged plan view of a damping bush 2 that may be formed as a rubber-metal bush having at least two different lower sections. A lower section of the damping bush 2 can here be a rubber section consisting of rubber and another section can be a metal section.

In one aspect, the rubber section of the damping bush 2 is supported within the metal section. The damping bush 2 can further comprise a leadthrough 21 that may be arranged radially centrally or also asymmetrically and that is at least partly cylindrical, through which leadthrough a coupling device can be led to couple the damping bush 2 to the hydraulic cylinder 1. At least one radial leadthrough 22 or 22' can be provided spaced apart radially outwardly therefrom that can be dimensioned in dependence on the desired damping properties of the damping bush.

The upper second leadthrough 22 shown in the embodiment of FIG. 4 can have regions with radial extents of different amounts. A small radial extent of the leadthrough 22 may be provided in a middle region in the peripheral direction of the leadthrough 22. The outer regions of the leadthroughs 22 viewed in the peripheral direction can in contrast have larger radial extents, or vice versa.

As can be recognized by the example of the lower second leadthrough 22', the second leadthrough 22' can also have a constant radial extent viewed in the peripheral direction. It is furthermore conceivable to provide differently dimensioned second leadthroughs 22, 22' and also different numbers of said second leadthroughs 22, 22' at a damping bush 2, depending on the desired elastic behavior of the damping bush 2.

At least one first recess 23 extending substantially in the peripheral direction can be provided in a radially outer region, for example, in the rubber section of the damping bush 2, said first recess, for example, being able to be provided at the same radial spacing from the center axis of the damping bush 2 as the second leadthroughs 22, 22'. The depth of the first recess 23 can be selected to influence the elastic behavior of the damping bush 2.

A second recess 24 can furthermore be provided that at least partly extends in the peripheral direction and that can be arranged radially further inwardly than the first recess 23. Two or more second recesses 24 can furthermore be provided that can be separated from one another by means of webs 25. The webs 25 and the second recesses 24 can be differently dimensioned in dependence on the desired damping behaviors and can, for example, have different depths or widths.

The damping bush 2 can be produced without parts movable relative to one another or with parts only movable elastically relative to one another. It is further conceivable that the damping bush 2 comprises two metal sections of which one is provided radially outwardly and one is provided radially inwardly, in the region of the first leadthrough 21. In one aspect, a metal section limits the first leadthrough 21 and/or is hollow cylindrical.

The diameter of the first leadthrough 21 of the damping bush 2 can approximately correspond to the axial extent of the damping bush 2 and may be formed at least partly as hollow cylindrical. The difference between the diameter of the first leadthrough 21 and the axial extent of the damping bush 2 may comprise less than 50% of the respective longer dimension.

The invention claimed is:

1. A cabin lifter for a material transfer unit comprising at least one hydraulic cylinder supported in a clamped manner for adjustment of the cabin lifter, wherein the hydraulic cylinder is extendable and retractable along an axis of operation of the hydraulic cylinder, and the hydraulic cylinder is supported via at least one damping bushing at the cabin lifter or at another section of the material transfer unit, the at least one damping bushing having at least one circular first recess positioned radially outward from a first leadthrough and radially inward from an outer perimeter of the damping bushing, the at least one first recess oriented to extend from a lower portion of the damping bushing to an upper portion of the damping bushing, the lower portion opposite the upper portion with the first leadthrough positioned therebetween, wherein the upper portion, the lower portion, and the first leadthrough are oriented along the axis of operation of the hydraulic cylinder, wherein the lower portion and the upper portion each include a web feature oriented along the axis of operation, wherein the damping bushing comprises at least one second recess radially positioned between the first recess and the first leadthrough, wherein the damping bushing comprises at least two symmetrically opposite recesses of said at least one first recess extending in a peripheral direction of the damping bushing, and wherein the damping bushing further comprises at least two of said second recess symmetrically opposed to one another.

2. The cabin lifter in accordance with claim 1, wherein the damping bushing is a rubber-metal bushing.

3. The cabin lifter in accordance with claim 1, wherein at least one damping bushing is supported at a ground side or at a bar side at the hydraulic cylinder.

4. The cabin lifter in accordance with claim 1, wherein the damping bushing is coupled to the cabin lifter or to another section of the material transfer unit by at least one bearing shell.

5. A damping bushing for a cabin lifter for a material transfer unit, wherein the cabin lifter comprises at least one hydraulic cylinder supported in a damped manner for the adjustment of the cabin lifter, wherein the hydraulic cylinder is extendable and retractable along an axis of operation of the hydraulic cylinder, and the hydraulic cylinder is supported via at least one damping bushing at the cabin lifter or at another section of the material transfer unit, and wherein the damping bushing comprises a first leadthrough arranged radially centrally wherein the at least one leadthrough is at least partly cylindrical, the at least one damping bushing having at least one circular first recess positioned radially outward from the first leadthrough and radially inward from an outer perimeter of the damping bushing, the at least one first recess oriented to extend from a lower portion of the damping bushing to an upper portion of the damping bushing, the lower portion opposite the upper portion with the first leadthrough positioned therebetween, wherein the upper portion, the lower portion, and the first leadthrough are oriented along the axis of operation of the hydraulic cylinder, wherein the lower portion and the upper portion each include, a web feature oriented along the axis of operation, wherein the damping bushing further comprises at least one second recess radially positioned between the first recess and the first leadthrough, wherein the damping bushing comprises at least two symmetrically opposite recesses of said at least one first recess extending in a peripheral direction of the damping bushing, and wherein the damping bushing further comprises at least two of said second recess symmetrically opposed to one another.

6. The damping bushing in accordance with claim 5, wherein the damping bushing comprises at least one second leadthrough disposed radially further outwardly than the first leadthrough.

7. The damping bushing in accordance with claim 6, wherein the at least one second leadthrough is oriented along an axis extending across a diameter of the first leadthrough and substantial parallel to the axis of operation of the hydraulic cylinder.

8. The damping bushing of claim 5, wherein the damping bushing is a rubber-metal bushing.

9. A material transfer unit for a cabin lifter, wherein the cabin lifter comprises at least one hydraulic cylinder supported in a damped manner for adjustment of the cabin lifter, wherein the hydraulic cylinder is extendable and retractable along an axis of operation of the hydraulic cylinder, and the hydraulic cylinder is supported via at least one damping bushing at the cabin lifter or at another section of the material transfer unit, the at least one damping bushing having at least one circular first recess positioned radially outward from a first leadthrough and radially inward from an outer perimeter of the damping bushing, the at least one first recess oriented to extend from a lower portion of the damping bushing to an upper portion of the damping bushing, the lower portion opposite the upper portion with the first leadthrough positioned therebetween, wherein the upper portion, the lower portion, and the first leadthrough are oriented along the axis of operation of the hydraulic cylinder, wherein the lower portion and the upper portion each include a web feature oriented along the axis of operation, wherein the damping bushing further comprises at least one second recess radially positioned between the first recess and the first leadthrough, wherein the damping bushing comprises at least two symmetrically opposite recesses of said at least one first recess extending in a peripheral direction of the damping bushing, and wherein the damping bushing further comprises at least two of said second recess symmetrically opposed to one another.

10. The cabin lifter of claim 1, wherein the at least two second recesses are separated from one another circumferentially by the web feature of the lower portion and the web feature of the upper portion.

11. The cabin lifter of claim 1, wherein the hydraulic cylinder is supported via two damping bushings, and wherein each damping bushing is coupled via a bearing shell.

12. The material transfer unit of claim 9, wherein the at least two second recesses are separated from one another circumferentially by the web feature of the lower portion and the web feature of the upper portion.

13. The damping bushing of claim 7, wherein the damping bushing comprises at least two symmetrically opposite second leadthroughs oriented along the axis extending across the diameter of the first leadthrough and parallel to the axis of operation of the hydraulic cylinder.

\* \* \* \* \*